(12) United States Patent
Huang

(10) Patent No.: US 9,456,674 B2
(45) Date of Patent: Oct. 4, 2016

(54) CASE SUPPORTING ELECTRONIC DEVICE

(71) Applicant: HON HAI PRECISION INDUSTRY CO., LTD., New Taipei (TW)

(72) Inventor: Fu-Kuo Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 21 days.

(21) Appl. No.: 14/517,544

(22) Filed: Oct. 17, 2014

(65) Prior Publication Data
US 2015/0151887 A1 Jun. 4, 2015

(30) Foreign Application Priority Data
Nov. 30, 2013 (CN) .......................... 2013 1 0622725

(51) Int. Cl.
*A45C 11/00* (2006.01)
*G06F 1/16* (2006.01)

(52) U.S. Cl.
CPC .......... *A45C 11/00* (2013.01); *A45C 2011/003* (2013.01); *A45C 2200/15* (2013.01); *G06F 1/166* (2013.01); *G06F 2200/1633* (2013.01)

(58) Field of Classification Search
CPC ............ A45C 11/00; A45C 2011/002; A45C 2011/003; H04M 1/04; G06F 2200/1633; G06F 2200/1613; G06F 1/1628; G06F 1/166
See application file for complete search history.

(56) References Cited

U.S. PATENT DOCUMENTS

| 8,794,436 B2* | 8/2014 | Hsu | F16M 11/041 206/320 |
| 2013/0100055 A1* | 4/2013 | Lauder | G06F 1/1656 345/173 |
| 2014/0202891 A1* | 7/2014 | Piatt | A45C 13/34 206/45.24 |
| 2014/0246340 A1* | 9/2014 | Jiang | A45C 11/00 206/45.23 |

* cited by examiner

*Primary Examiner* — Anthony Stashick
*Assistant Examiner* — Mollie Llewellyn
(74) *Attorney, Agent, or Firm* — Zhigang Ma

(57) ABSTRACT

A case includes a first plate, a second plate, a first sidewall protruding from the first plate, a second sidewall protruding from the second plate and a cover. The second plate is attached to the first plate and is rotatable around the first plate to obtain different angles between the first plate and the second plate. The second sidewall, the first sidewall, the first plate and the second plate define a receiving space when the angle is 180 degrees. The cover is attached to the second sidewall and is rotatable around the second sidewall to position an end of the cover in front of the first plate. A length of the cover between the end and the second sidewall can be variable corresponding to the different angles. The end of the cover is rotatable to abut against the first sidewall holding the first plate at different angles.

17 Claims, 5 Drawing Sheets

CASE SUPPORTING ELECTRONIC DEVICE

CROSS-REFERENCE TO RELATED APPLICATIONS

This application claims priority to Chinese Patent Application No. 201310622725.X filed on Nov. 30, 2013 in the China Intellectual Property Office, the contents of which are incorporated by reference herein.

FIELD

The present disclosure relates to cases for receiving portable electronic devices, and in particular relates to a case which can receive and support a portable electronic device.

BACKGROUND

Portable electronic devices are received in cases to protect the electronic device. When a user uses the portable electronic device, one hand supports the portable electronic device and the other hand operates the functions of the portable electronic device.

BRIEF DESCRIPTION OF THE DRAWINGS

Implementations of the present technology will now be described, by way of example only, with reference to the attached figures.

DETAILED DESCRIPTION

Figure 1:
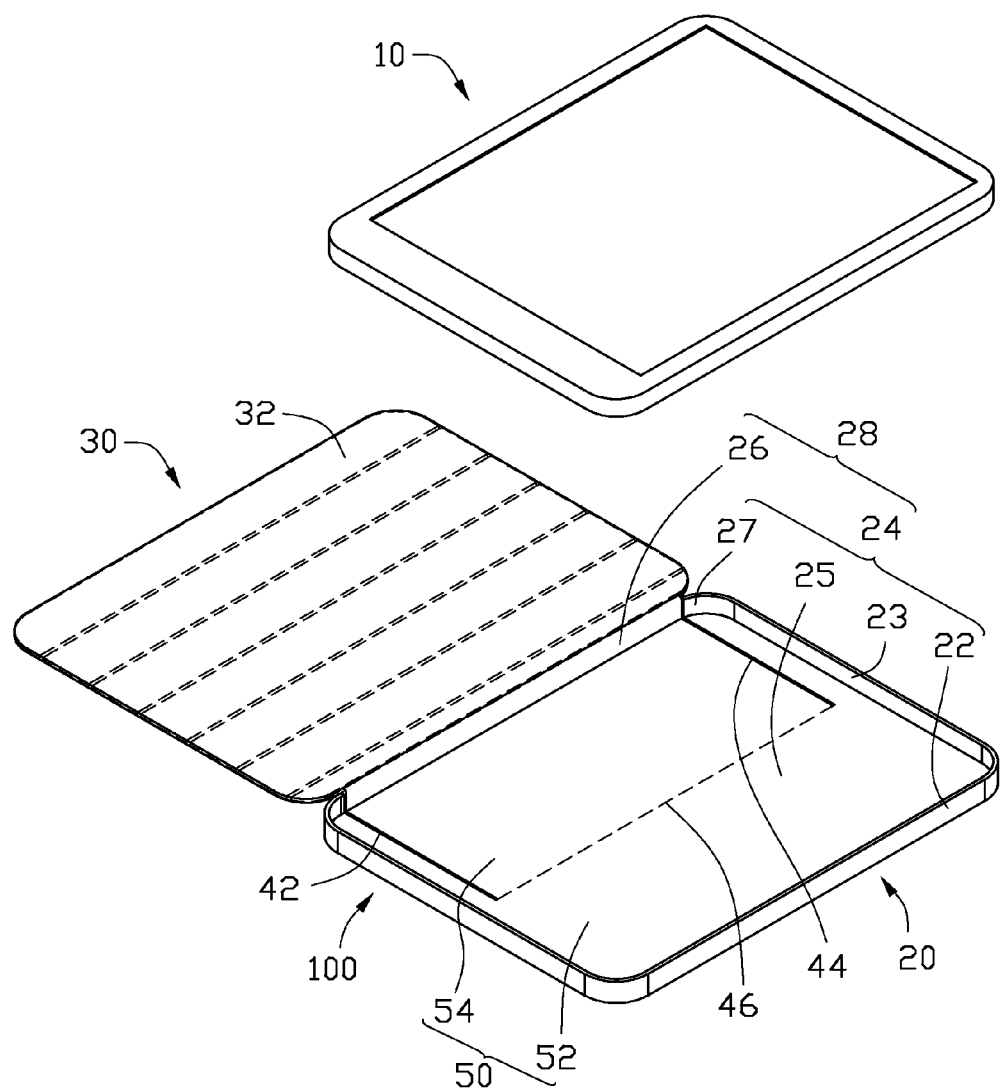
FIG. 1 is an isometric view of a case with a portable electronic device separated from the case.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

A definition that applies throughout this disclosure will now be presented.

The term "comprising" means "including, but not necessarily limited to"; it specifically indicates open-ended inclusion or membership in a so-described combination, group, series and the like.

Figure 2:
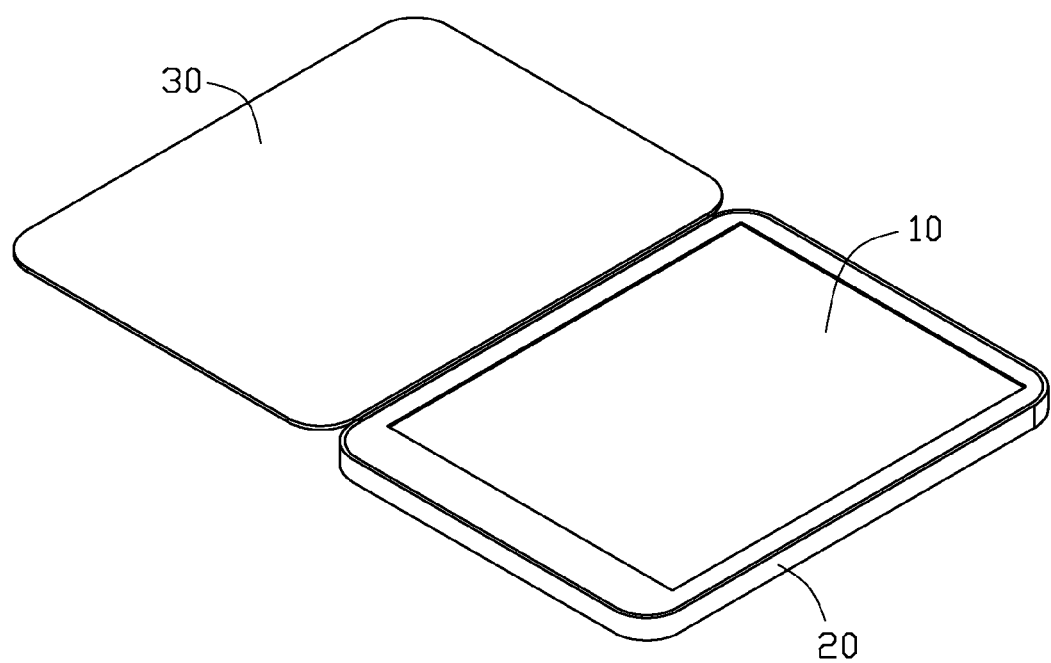
FIG. 2 is an isometric view of the case in FIG. 1, with the portable electronic device received in the case.

FIGS. 1 and 2 illustrate that a case 100 includes a shell 20 and cover 30. The shell 20 includes a base plate 50 and a peripheral wall 28 protruding from an edge of the base plate 50. The base plate 50 and the peripheral wall 28 cooperatively define a receiving space 25 for receiving a portable electronic device 10.

The base plate 50 includes a first plate 52 and a second plate 54 rotationally attached to the first plate 52. The peripheral sidewall 28 includes a first sidewall 24 and a second sidewall 26 detachable from the first sidewall 24. The first sidewall 24 protrudes from the first plate 52. The second sidewall 26 protrudes from the second plate 54. The cover 30 is attached to the second sidewall 26 and is rotatable around the second sidewall 26 in a first direction to cover the electronic device 10 when the electronic device 10 is received in the receiving space 25. The cover is further rotatable around the second sidewall 26 in a second reverse direction exposing the electronic device 10.

In the embodiment, the first plate 52 includes a first edge 42, a second edge 44 opposite to the first edge 42 and a third edge 46 connected between the first edge 42 and the second edge 44. The first edge 42, the second edge 44 and the third edge 46 cooperatively surround an opening 29 (shown in FIG. 4). A size of the second plate 54 is same as the opening 29. The second plate 54 is received in the opening 27 to form the base plate 50.

The second sidewall 26 protrudes from an edge of the second plate 54 away from the third edge 46. The first sidewall 24 includes a first portion wall 22, two second portion walls 23 and two third portion walls 27. The first portion wall 22 is parallel to the second sidewall 26 and is longer than the second sidewall 26. The two second portion walls 23 are perpendicular to the second sidewall 26 and are attached to two ends of the first portion wall 22. The two third portion walls 27 are positioned between two ends of the second sidewall 26 and the two second portion walls 23.

The cover 30 includes a number of rotation pieces 32 parallel to the third edge 46. The rotation pieces 32 are arranged side by side and are rotatable around an adjacent rotation piece 32 to be positioned above the adjacent rotation piece 32. In the embodiment, the cover 30 includes seven rotation pieces 32. The rotation pieces 32 are magnetic plates. Two adjacent magnetic plates are attractable to each other. The magnetic plates are wrapped by a soft bag.

Figure 3:
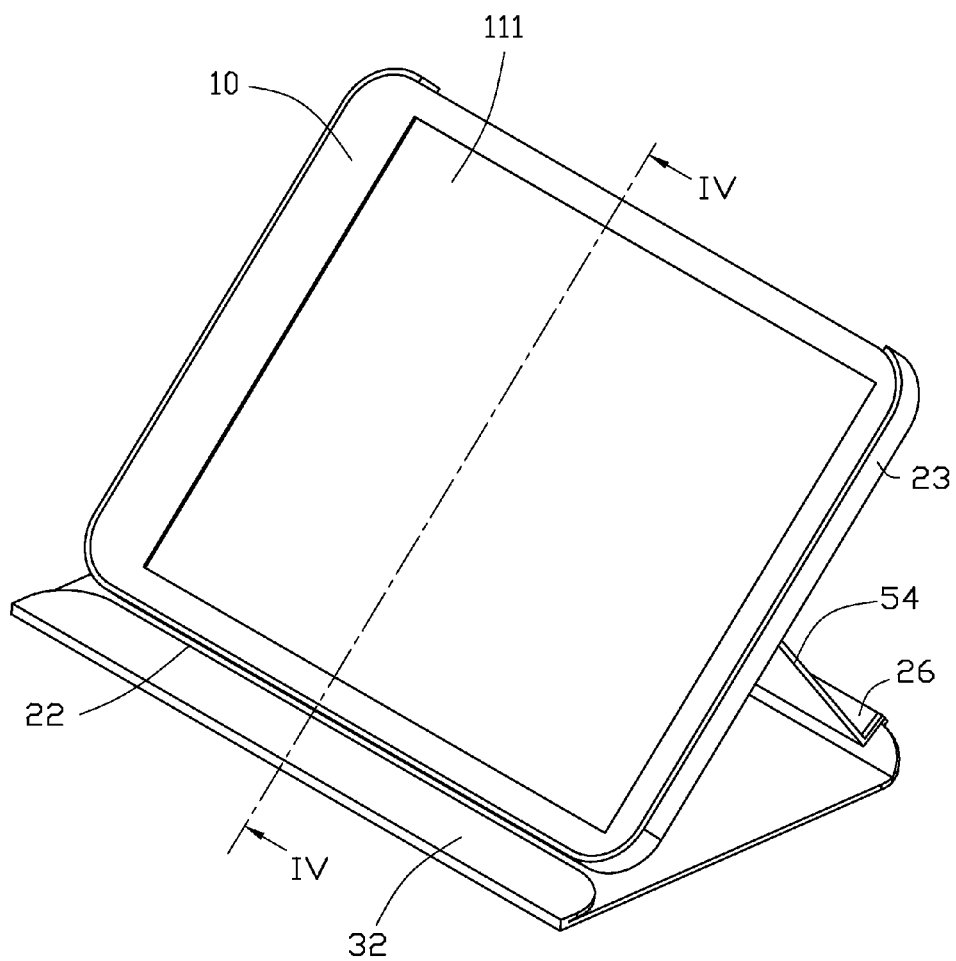
FIG. 3 is an isometric view of the case in FIG. 1, with the portable electronic device supported by the case in a first angle.
Figure 4:
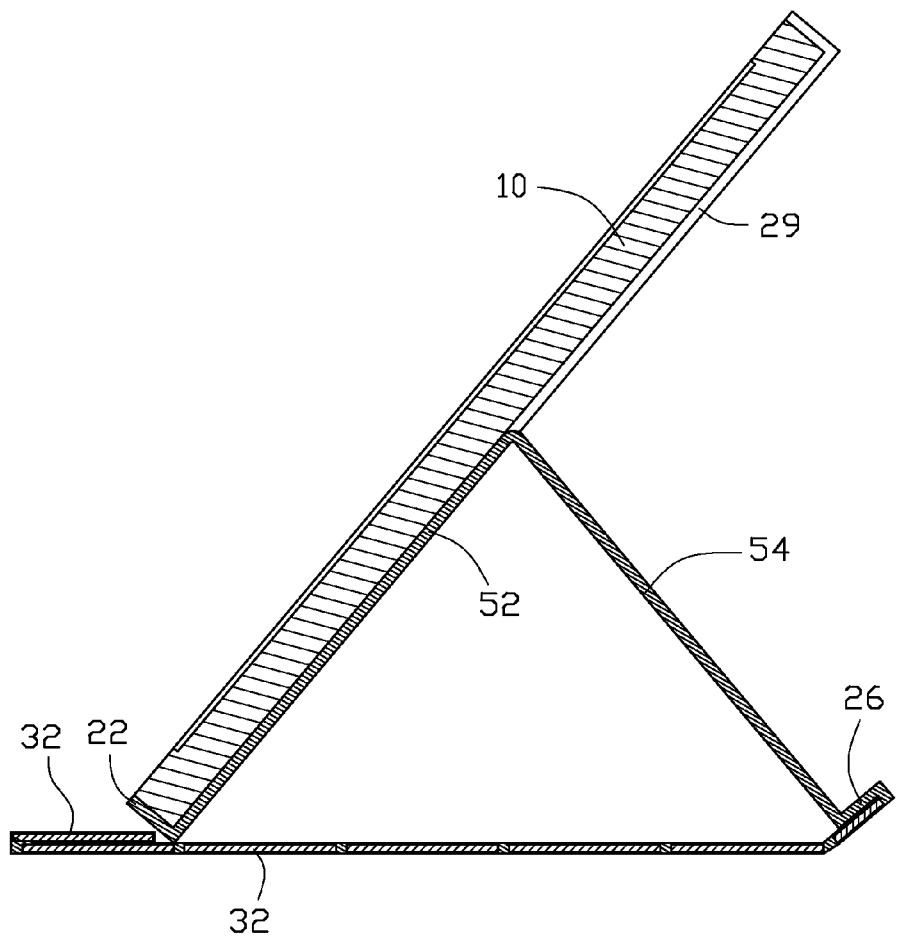
FIG. 4 is a cross-sectional view taken along the line IV-IV of FIG. 3.

FIGS. 3 and 4 illustrate that the second plate 54 rotates around the third edge 46 to obliquely support the first plate 52 in a first position under the first plate 52. The cover 30 rotates around the second sidewall 26 to be positioned under the first plate 52 and to position two rotation pieces 32 in front of the first plate 52. One of the two rotation pieces 32 rotates 180 degrees toward the first portion wall 22 to be positioned on top of the other rotation piece 32 and abut against the first portion wall 22 to hold the first plate 52 in the first position.

Figure 5:
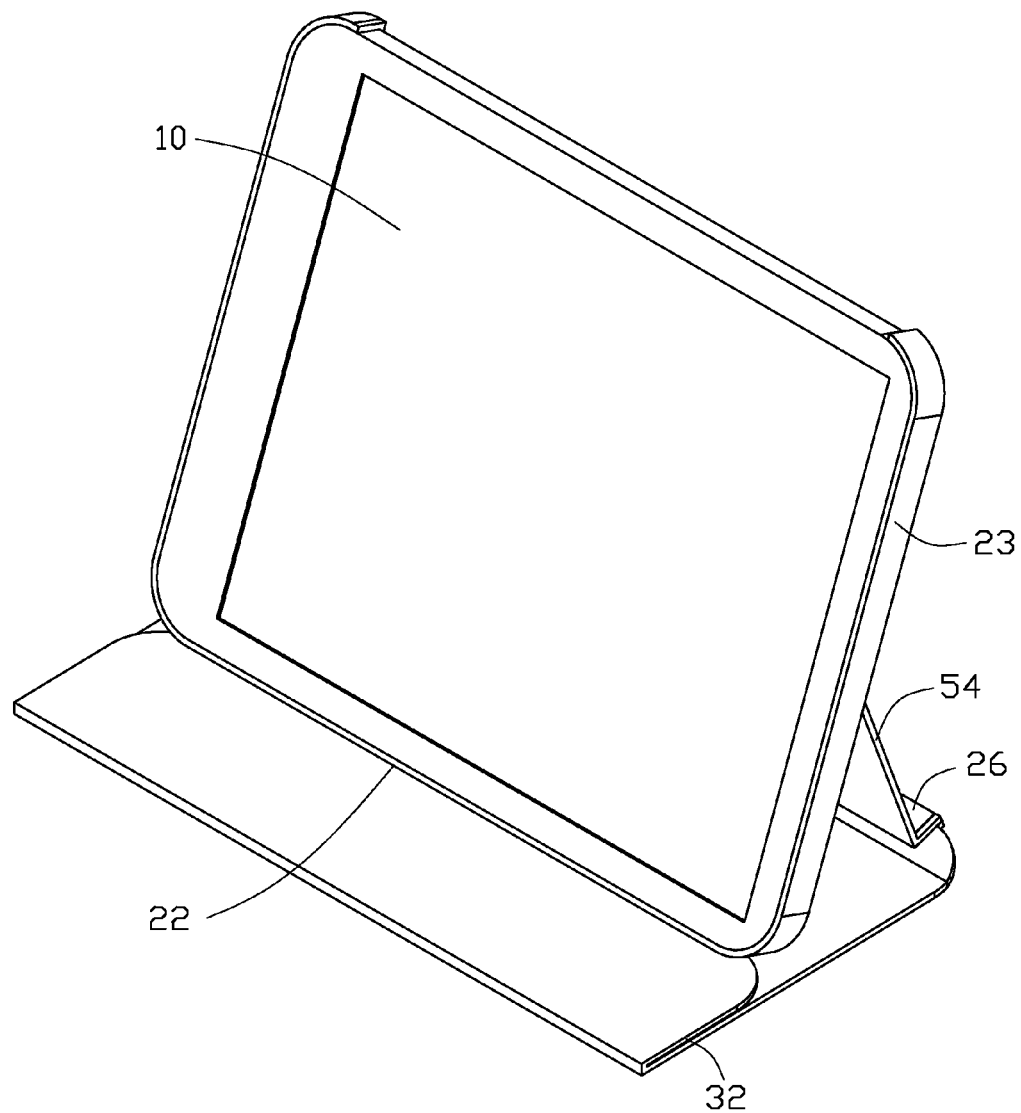
FIG. 5 is similar to FIG. 3, but with the portable electronic device supported by the case in a second angle.

FIG. 5 illustrates that the second plate 54 rotates around the third edge 46 to obliquely support the first plate 52 in a second position under the first plate 52. The cover 30 rotates around the second sidewall 26 to be positioned under the first plate 52 positioning four rotation pieces 32 in front of the first plate 52. Two of the four rotation pieces 32 rotate 180 degrees toward a first portion wall 22 to be positioned on top of the other two rotation pieces 32 and abut against the first portion wall 22 to hold the first plate 52 in the second position.

The embodiments shown and described above are only examples. Even though numerous characteristics and advantages of the present technology have been set forth in the foregoing description, together with details of the structure and function of the present disclosure, the disclosure is illustrative only, and changes may be made in the details, including in matters of shape, size and arrangement of the parts within the principles of the present disclosure up to, and including, the full extent established by the broad general meaning of the terms used in the claims.

What is claimed is:

1. A case comprising:
   a first plate;
   a second plate attached to the first plate and rotatable around the first plate to obtain different angles between the first plate and the second plate;
   a first sidewall protruding from the first plate;
   a second sidewall protruding from the second plate, the second sidewall, the first sidewall, the first plate and the second plate cooperatively defining a receiving space for receiving an electronic device when the different angle is 180 degrees; and
   a cover attached to the second sidewall and rotatable around the second sidewall to position an end of the cover away from the second sidewall in front of the first plate, a length of a part of the cover in front of the first plate is variable corresponding to the different angles, the end of the cover is rotatable to abut against the first sidewall to hold the first plate at different angles,
   wherein the first sidewall comprises a first wall portion, two second wall portions and two third wall portions, the first wall portion is longer than the second sidewall, the two second wall portions are attached to two ends of the first wall portion, and the two third wall portions are positioned between two ends of the second sidewall and the two second wall portions.

2. The case as claimed in claim 1, wherein the cover comprises at least four rotation pieces side by side and rotatable around an adjacent rotation piece.

3. The case as claimed in claim 2, wherein two of the rotation pieces can be positioned between the first sidewall and the second sidewall, and another two of the rotation pieces can be positioned in front of the first sidewall and totally overlap each other to hold the first plate in a first angle.

4. The case as claimed in claim 2, wherein four of the rotation pieces can be positioned in front of the first sidewall such that two of the four rotation pieces totally overlap the other two of the four rotation pieces to hold the first plate in a second angle.

5. The case as claimed in claim 2, wherein the rotation pieces are adjacent magnetic plates that are attractable to each other.

6. The case as claimed in claim 5, wherein the cover further comprises a soft bag, the magnetic plates being received in the soft bag.

7. The case as claimed in claim 1, wherein the first plate defines an opening that is equal to the dimensions of the second plate, the second plate being rotationally received in the opening.

8. The case as claimed in claim 7, wherein the first plate comprises a first edge, a second edge opposite to the first edge, and a third edge connected between the first edge and the second edge, wherein the first edge, the second edge and the third edge surround the opening.

9. The case as claimed in claim 1, wherein the first wall portion is parallel to the second sidewall, and the two second wall portions are perpendicular to the second sidewall.

10. A case comprising:
    a shell comprising:
       a base plate comprising a first plate and a second plate attached to the first plate, the second plate rotatable around the first plate to obliquely support the first plate at a first position;
       a peripheral sidewall protruding from an edge of the base plate, the peripheral sidewall comprising a first sidewall protruding from the first plate and a second sidewall protruding from the second plate and detachable from the first sidewall; and
       a cover attached to the second sidewall and rotatable around the second sidewall to position an end of the cover away from the second sidewall in front of the first plate, the end of the cover forming a rotation piece rotatable toward the first sidewall and abut against the first sidewall to hold the first plate at the first position;
    wherein the first sidewall comprises a first wall portion, two second wall portions and two third wall portions, the first wall portion is longer than the second sidewall, the two second wall portions are attached to two ends of the first wall portion, and the two third wall portions are positioned between two ends of the second sidewall and the two second wall portions.

11. The case as claimed in claim 10 wherein the rotation piece and an adjacent part of the cover include attractable magnetic plates.

12. The case as claimed in claim 10, wherein the adjacent part of the cover is also a rotation piece, the cover further comprising four additional rotation pieces, such that six rotation pieces in total can be positioned in front of the first plate such that three rotation pieces can rotate to totally overlap three other rotation pieces.

13. The case as claimed in claim 12, wherein two rotation pieces can be positioned between the first sidewall and the second sidewall, the other four rotation pieces can be positioned in front of the first plate such that two of the other four rotation pieces can totally overlap the other two of the four rotation pieces to hold the first plate at a third position.

14. The case as claimed in claim 13, wherein the cover further comprises a soft bag, the rotation pieces being received in the soft bag.

15. The case as claimed in claim 10, wherein the first plate defines an opening that is equal to the dimensions of the second plate, the second plate being rotationally received in the opening to form the base plate.

16. The case as claimed in claim 15, wherein the first plate comprises first edge, a second edge opposite to the first edge, and a third edge connected between the first edge and the second edge, wherein the first edge, the second edge and the third edge surround the opening.

17. The case as claimed in claim 10, wherein the first wall portion is parallel to the second sidewall, and the two second wall portions are perpendicular to the second sidewall.

* * * * *